No. 643,052. Patented Feb. 6, 1900.
W. L. HAINES & W. C. GRAHAM.
PEA HARVESTER.
(Application filed Oct. 9, 1899.)
(No Model.) 2 Sheets—Sheet 1.
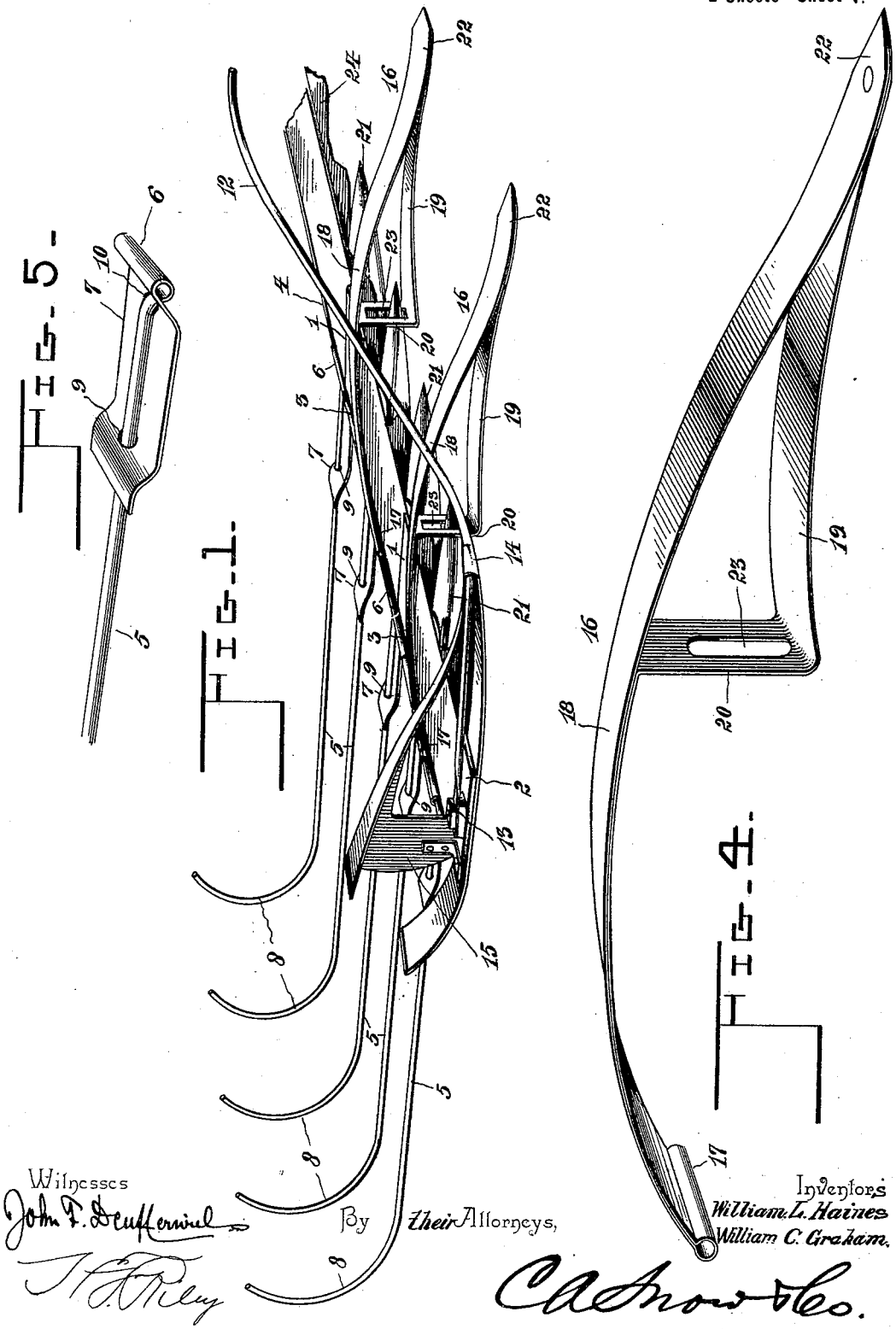
Witnesses
Inventors
William L. Haines
William C. Graham
By their Attorneys, No. 643,052. Patented Feb. 6, 1900.
W. L. HAINES & W. C. GRAHAM.
PEA HARVESTER.
(Application filed Oct. 9, 1899.)
(No Model.) 2 Sheets—Sheet 2.
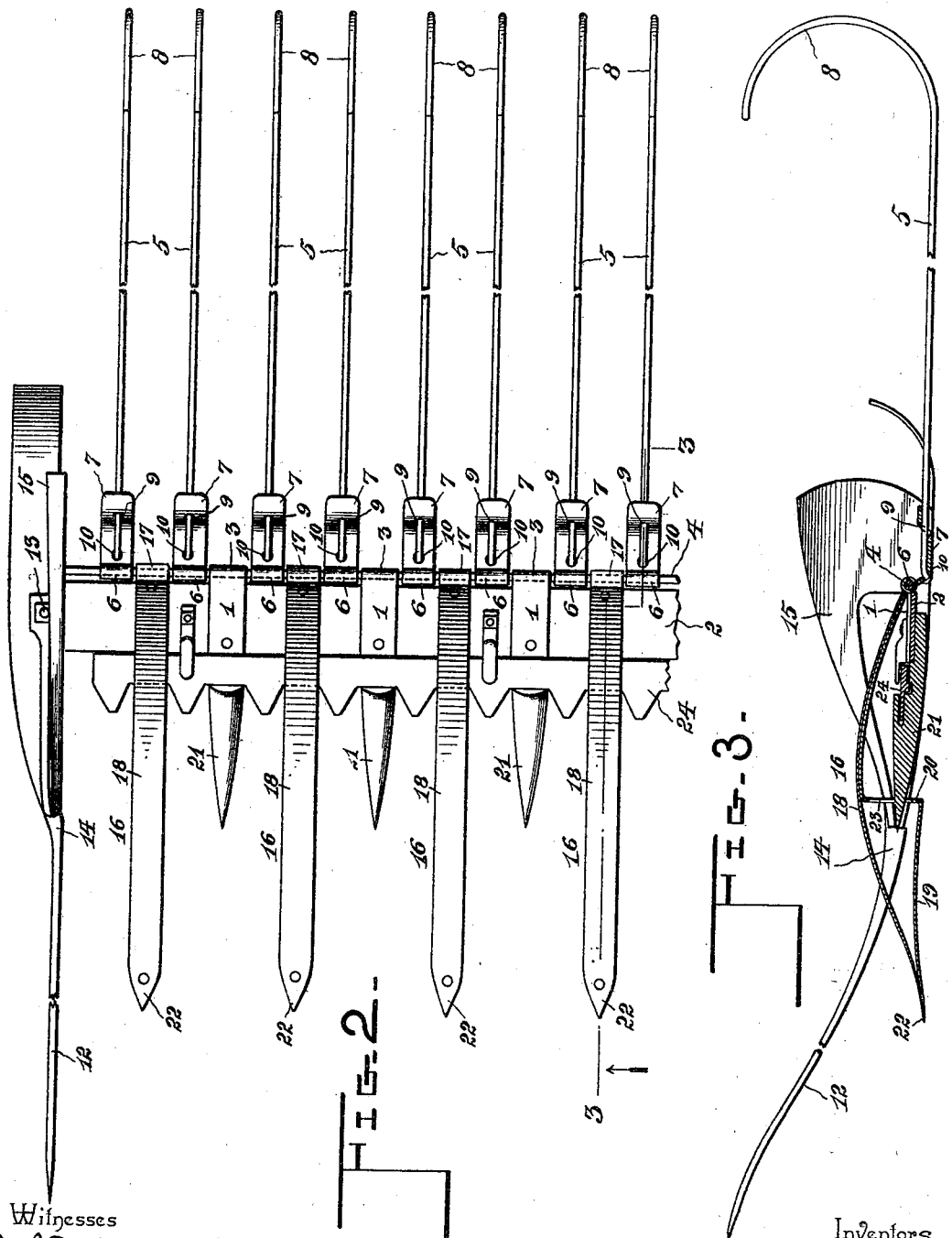
Witnesses
Inventors
William L. Haines,
William C. Graham.
By their Attorneys,

UNITED STATES PATENT OFFICE.

WILLIAM L. HAINES AND WILLIAM C. GRAHAM, OF DICE, MICHIGAN.

PEA-HARVESTER.

SPECIFICATION forming part of Letters Patent No. 643,052, dated February 6, 1900.

Application filed October 9, 1899. Serial No. 733,045. (No model.)

*To all whom it may concern:*

Be it known that we, WILLIAM L. HAINES and WILLIAM C. GRAHAM, citizens of the United States, residing at Dice, in the county of Saginaw and State of Michigan, have invented a new and useful Pea-Harvester, of which the following is a specification.

The invention relates to improvements in pea-harvesters.

The object of the present invention is to improve the construction of harvesting-machines and to provide a simple, inexpensive, and efficient construction adapted to be readily applied to the cutting apparatus of an ordinary mowing-machine and capable of being effectively employed for harvesting peas and of lifting the vines, so that they may be properly operated on by the cutting apparatus, and of collecting such vines until bunches of the desired size have accumulated.

The invention consists in the construction and novel combination and arrangement of parts, hereinafter fully described, illustrated in the accompanying drawings, and pointed out in the claim hereto appended.

In the drawings, Figure 1 is a perspective view showing the harvesting attachment applied to the cutting apparatus of a mowing-machine. Fig. 2 is a plan view of a portion of the cutting apparatus. Fig. 3 is a longitudinal sectional view on line 3 3 of Fig. 2. Fig. 4 is a detail perspective view of one of the vine-lifting devices. Fig. 5 is a detail perspective view of the inner or front end of one of the bunching-rods.

Like numerals of reference designate corresponding parts in all the figures of the drawings.

1 designates a series of plates or leaves secured to and extending rearward from the finger-bar 2 of the cutting apparatus of a mowing-machine and provided at their rear ends with alined eyes 3, receiving and supporting a pintle-rod 4, to which is hinged a series of bunching-rods 5. The pintle-rod, which is arranged at the rear edge of the finger-bar, passes through the eyes 3 and receives eyes 6 of leaves or plates 7, to which the bunching-rods are secured, whereby the latter are hinged to the cutting apparatus and are adapted to rise and fall and yield to the configuration of the surface over which the machine travels.

The rear ends or portions 8 of the bunching-rods curve upward and are adapted to form a support for the vines after they have been operated on by the cutting apparatus, and the said rods are designed to hold the vines until a bunch of the desired size has accumulated, after which the bunch is removed.

The leaves or plates 7, which are arranged at the inner or front ends of the rods, are provided adjacent to their ends with angular bends to form intermediate depressed portions and are provided at the bends with longitudinally-alined perforations 9 and 10, through which the rods pass, whereby they are secured to the leaves or plates. The rear portion of the leaf or plate is upwardly bent to arrange the opening 9 in position for the rod to pass through it, and the inner or front terminal of the rod is bent at an angle and passed through the perforation 10 and riveted at the lower face of the plate or leaf.

At the outer end of the cutting apparatus is arranged a forwardly-extending inclined rod 12, which is adapted to divide or separate the vines and throw them downward into the path of the cutting apparatus. The lower or rear end of the rod is bolted or otherwise secured at 13 to the finger-bar, and the said rod is provided at a point between its ends with a rearwardly-disposed socket 14. This socket, which tapers toward its front end, fits over the point of the runner or shoe 15 and is retained thereon by the fastening device at the lower or rear end of the rod.

The vines are lifted from the ground and supported in position so that they may be properly operated on by the cutting apparatus, and this result is effected by means of lifting devices 16, provided at their rear ends with eyes 17, arranged on and supported by the pintle-rod 4, which forms a hinge-joint. Each lifting device consists of a curved or arched top portion 18, an approximately horizontal bottom portion 19, and a vertical connecting portion 20. The curved top, which is arched over the adjacent finger or guard 21 of the cutting apparatus, extends forward in advance of the same and terminates in a point 22, which runs along the ground, and the approximately horizontal bottom portion 19 extends rearward from the said point and is slightly curved, as shown, to present a concave lower face, and it terminates in rear of the point of the guard-finger 21. The vertical portion 20, which connects the rear end of the bottom portion 19 with the top portion, is provided with a vertical slot 23, through which the point of the guard-finger projects, whereby the lifting device is permitted a limited vertical oscillation independent of the movement of the cutting apparatus to enable it to yield to the inequalities of the ground. The pintle-rod 4 forms a hinge connection for the lifting device, which is adapted to rise and fall, as before explained. The points 22 of the lifting devices pass beneath the vines, which are raised by the arched top portions 18 and held in position to be operated on by the cutter-bar 24 of the cutting apparatus.

The cutting apparatus, which is of the usual construction, is operated and controlled in the usual manner, and as this construction is well understood in the art further description thereof is not necessary.

It will be seen that the harvesting attachment is simple and comparatively inexpensive in construction, that it is adapted to be readily applied to the cutting apparatus of a mowing-machine, and that it is capable of lifting the vines and supporting the same while they are severed by the cutting apparatus, and of collecting the said vines until bunches of the desired size have accumulated. It will also be apparent that the bunching-rods are hinged to the cutting apparatus and are capable of independent adjustment to conform to the configuration of the ground over which the machine travels, and that the lifting devices are hinged to the pintle-rod of the said bunching-rods and are capable of independent vertical adjustment.

Changes in the form, proportion, size, and the minor details of construction within the scope of the appended claim may be resorted to without departing from the spirit or sacrificing any of the advantages of this invention.

What is claimed is—

In a machine of the class described, the combination with a cutting apparatus, of leaves or plates secured to the top of the cutting apparatus and extending rearward therefrom and provided with eyes, a pintle-rod arranged in said eyes and located at the back of the cutting apparatus, the lifting devices having eyes receiving the pintle-rod, the leaves or plates 7 of thin metal extending rearward from the pintle-rod and provided with eyes receiving the same, said leaves or plates 7 being angularly bent adjacent to their ends to form a depressed intermediate portion and provided at the bends with longitudinally-alined openings, and the bunching-rods passing through the longitudinally-alined openings of the leaves or plates 7, substantially as described.

In testimony that we claim the foregoing as our own we have hereto affixed our signatures in the presence of two witnesses.

WILLIAM L. HAINES.
WILLIAM C. GRAHAM.

Witnesses:
LEVI W. HAINES,
LAURA H. HAINES.